Sept. 12, 1939. E. M. PHILLIPS 2,172,890
REMOVABLE SEAT COVER
Filed Nov. 26, 1937 2 Sheets-Sheet 1
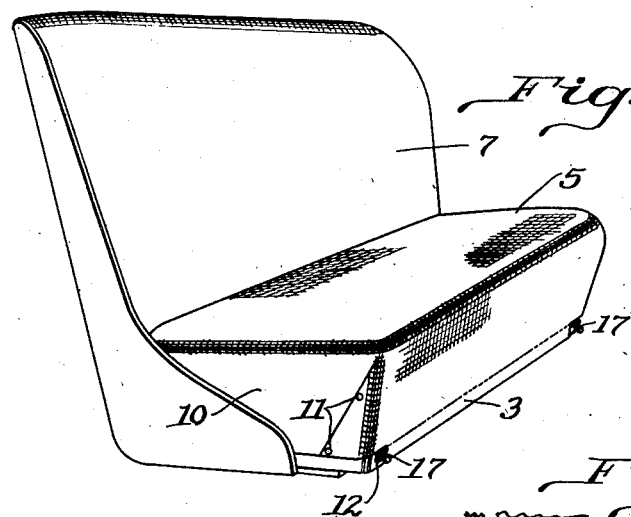
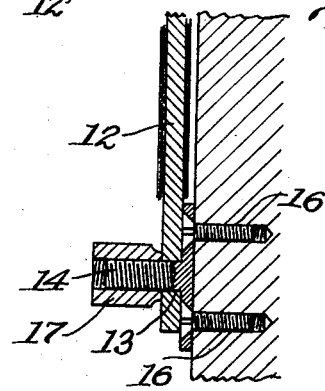
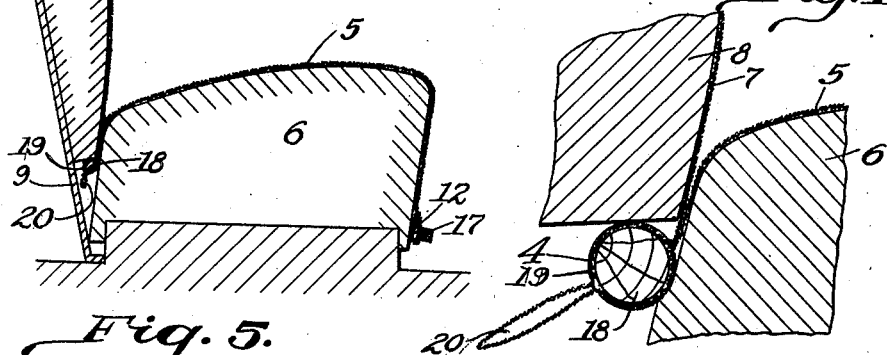
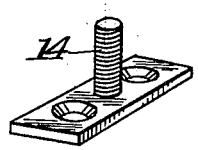
Inventor
Elizabeth M. Phillips
By W. S. McDowell
Attorney Inventor
Elizabeth M. Phillips By
Attorney Patented Sept. 12, 1939

2,172,890

UNITED STATES PATENT OFFICE 2,172,890

REMOVABLE SEAT COVER

Elizabeth M. Phillips, Columbus, Ohio

Application November 26, 1937, Serial No. 176,605

1 Claim. (Cl. 155—182)

This invention relates to fabric slip covers of the type employed in connection with motor vehicle seat cushions, or in connection with chairs, davenports and other similar articles of furniture, the invention being particularly concerned with the design of such seat covers and the provision of cooperative means for effecting their ready and convenient attachment to or removal from associated seat structures.

Seat covers, as now designed for use, particularly on motor vehicle seat cushions, are difficult and tedious to remove and apply. Generally, the seat covers of the prior art are held in their applied positions by the use of a multiplicity of pins, snap fasteners, elastic bands and/or tying cords. Seat covers to be effective in protecting the garments of motor vehicle occupants from soil, or in protecting the upholstery fabric of the seat cushions, should be kept clean by frequent laundering. As they are now constructed and applied, the difficulties attending their removal and application are so arduous that the tendency of most vehicle owners is to neglect the required renovation of the covers, with the result that they are used for long periods after cleaning is required, possess an unsightly appearance, and do not perform their intended service. These conditions are so well known that many motorists do not use seat covers, even though their advantages are well recognized.

It is, therefore, an object of the present invention to provide a new seat cover and attaching means therefor which conjointly provide an unusually high degree of convenience in effecting application to or removal from vehicle seat cushions, to the end of enabling such operations to be so quickly and easily performed that objections to the use of seat covers will be largely overcome and, further, enabling such coverings to be readily kept in their required state of cleanliness so that their maximum effectiveness may be realized.

Another object resides in the provision of a seat cover which, when in its applied position, will be held smooth, unwrinkled and taut so that its appearance will be attractive and orderly.

A further object resides in the provision of a seat cover of improved and simplified design, and one which will be quite economical and convenient to manufacture.

For a further understanding of the invention, reference is to be had to the following description and the accompanying drawings, wherein:

Fig. 1 is a perspective view of a motor vehicle seat structure having applied thereto the seat cover and cooperative fastening means forming the present invention;

Fig. 2 is a vertical sectional view taken through the seat structure and my improved slip cover therefor;

Fig. 3 is a detail horizontal sectional view on the plane indicated by the line III—III of Fig. 2 and disclosing the fastening means utilized in removably securing the ends of the seat cover to the frame of the seat structure;

Fig. 4 is a detail enlarged vertical sectional view taken through the cover at the point of junction between the lower cushion of a seat structure and the back cushion;

Fig. 5 is a detail perspective view of one of the attaching plates;

Figures 6, 7:
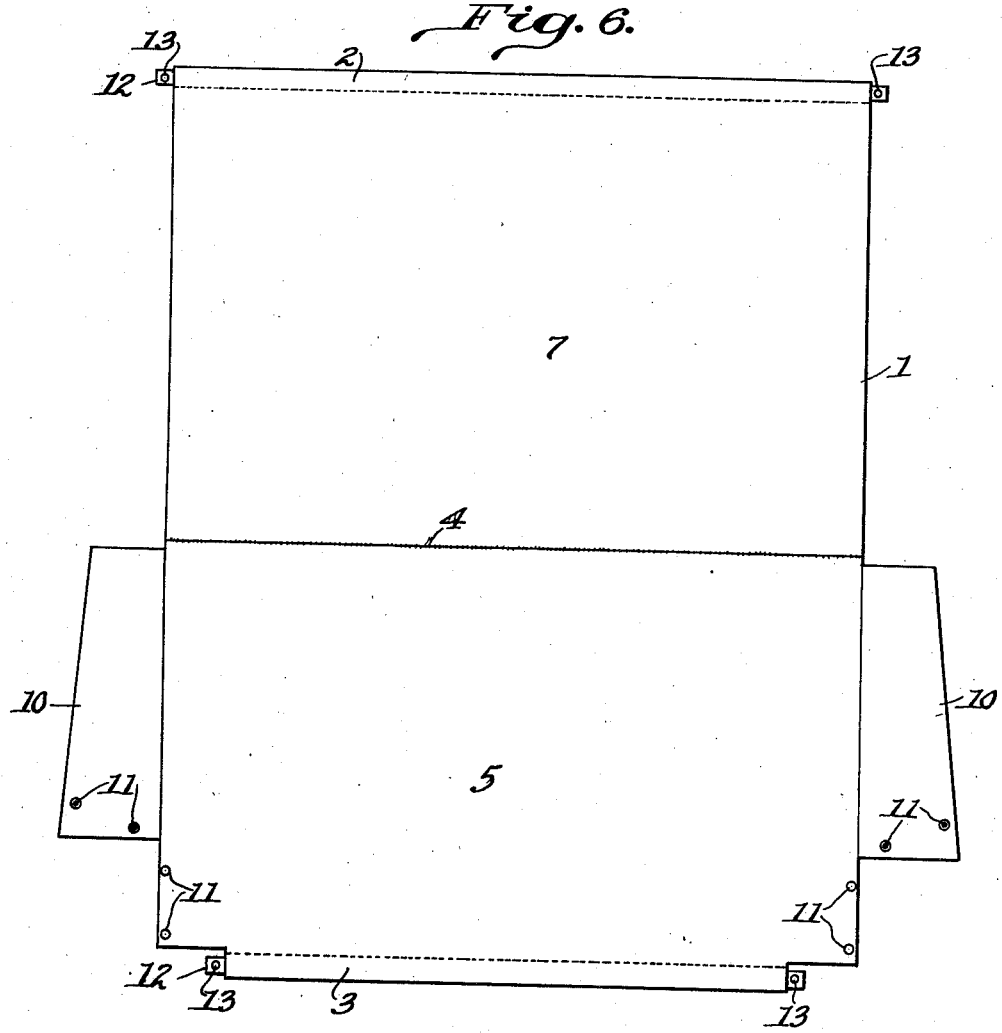
Fig. 6 is a blank view of the seat cover forming the present invention.
Fig. 7 is a detail perspective view of one of the attaching bars, which is removably positioned in the end hems of the cover.

The seat cover, comprising the present invention, is formed from a substantially rectangular fabric strip 1, as indicated in Fig. 6 of the drawings. The strip 1 may be of any suitable fabric customarily used in slip cover manufacture. At its opposite ends, the strip or sheet of fabric is longitudinally hemmed as at 2 and 3, and intermediately of its length as at 4. These hems are adapted to receive removable fastening members which are employed in securing the slips in their applied positions on associated seat structures. The portion 5 of the strip formed between the hems 3 and 4 is used to cover the removable seat cushion 6 of the seat structure of a motor vehicle, while the portion 7 of the fabric strip is adapted to cover and protect the back cushion 8 of said seat structure. The cushions 6 and 8 are suitably positioned on the frame 9 of the seat structure in the usual manner. The portion 5 of the strip 1 is formed with side wings 10 which, when the seat cover is applied, engage with the sides of the seat cushion 6, as shown in Fig. 1. Snap fasteners 11 are used to unite the overlapping edge portions of the wings 10 and contiguous edges of the portion 5 of the seat cover.

The ends of the cover are secured to the seat structure of the vehicle by the provision of flat metallic bars 12 which are removably received within the hems 2 and 3. The ends of the bars 12 are provided with openings 13, which are positioned over threaded studs 14 which project from metallic brackets 15. One pair of these brackets is secured to the frame constituting the rear of the back cushion 8. Preferably, threaded screws 16 are used in holding the brackets 15 in their applied positions. The threaded studs 14 receive exteriorly knurled nuts 17, which engage with the ends of the bars 12 to hold the latter in secured but removable clamped relationship with the brackets 15. Likewise, the intermediate hem 4 receives a cylindrical rod 18 which is located immediately below the bottom of the back cushion 8 and the rear of the seat cushion 6, the adjoining portions of said cushions holding the rod 18 against displacement so that the same will exert a drawing action on the portions 5 and 7 of the cover to hold the latter taut, stretched or free of wrinkles when in its applied position.

From the foregoing, it will be seen that in order to remove the cover from the seat structure, it is necessary merely to remove the nuts 17 from the studs 14, and to move the seat cushion 6 away from the back cushion 8. The seat cover may be then readily freed from its attaching means, and the bars 12 and the rod 18 may be removed from the hems 2, 3 and 4. This enables the seat cover to be readily laundered following a given period of use. In re-attaching the seat cover, the above procedure is of course reversed. The construction enables the seat cover to be removed or applied simply and conveniently and requires but a few minutes time.

From Fig. 4 of the drawings, it will be noted that the intermediate hem 4 is made double to provide a pair of casings 19 and 20. In this manner, a certain degree of adjustability is secured to adapt the cover to seats having varying depths and backs with varying heights. Another advantage resulting from this construction is the fact that in the event the cover should shrink, due to laundering, the second casing 20 may be used and the cover will fit without alteration.

What is claimed is:

A motor vehicle seat cover comprising a rectangular body of fabric, a hem formed at each end of said body, a plurality of transversely extending hems provided intermediate of the length of said body, said intermediate hems forming a pair of tubular casings, a fabric wing section secured to each side of said body between the intermediate hems and one end, said wing sections being disposed in closer relation to said intermediate hems than to the end of said body, means for detachably connecting the side edges of said body between the wings and the end nearest thereto with the adjacent edge of said wings, substantially rigid bars positioned in said hems, and means carried by the frame of the vehicle seat and cooperating with the end bars to hold said cover in position on said seat, the bar in one of said intermediate hems being alternately positionable in one casing formed by said hems to adapt the cover to seats of various sizes.

ELIZABETH M. PHILLIPS.